Nov. 24, 1964    F. VON HESSERT    3,158,120
CORE SOLDER
Filed Oct. 17, 1960
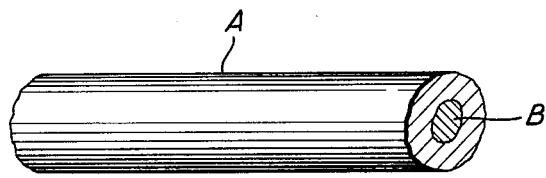
INVENTOR.
FREDERICK VON HESSERT
BY
ATTORNEY

United States Patent Office 3,158,120
Patented Nov. 24, 1964

3,158,120
CORE SOLDER
Frederick Von Hessert, West Orange, N.J., assignor to Fairmount Chemical Co., Inc., Newark, N.J., a corporation of New Jersey
Filed Oct. 17, 1960, Ser. No. 62,967
4 Claims. (Cl. 113—110)

The present invention relates to core solder, and it particularly relates to a core solder which may be utilized for electronic or general soldering.

It has been found that where hydrazine salts, and particularly hydrohalide salts, are utilized as fluxes, the hydrazine is difficult to incorporate into cores and in most cases is not effective, as near the soldering temperatures there will be sputtering and the flux will fall off the soldered parts. Thereby, there will be inefficient wetting and solder spread, resulting in gaps and poor joints.

Although not limited thereto, these difficulties are particularly experienced with core solders containing a cylinder of tin-lead alloy constituting 85 to 99% of the metal alloy with a central core constituting ½ to 3 or 4% of flux.

It is among the objects of the present invention to provide a more effective core solder which will have effective spreading properties and which will most satisfactory cover the joint which is to be soldered and which will not tend to sputter off or drop off without maximum effectiveness.

Another object is to provide most effective core solder containing relatively minute hydrazine, hydrohalide salts, which, nevertheless, will be most effective in relatively small quantities to give a soldered joint of maximum strength and uniformity.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above, it has been found most satisfactory to form a core solder having an external cylinder sheath of lead-tin alloy ranging from 65 to 35% tin constituent with an internal central core composed of hydrazine hydrobromide or hydrazine hydrochloride, to the amount of 90 to 98% of hydrazine salt with 2 to 10% of water.

In addition, there should be added $\frac{1}{10}$ to 1% of a high molecular weight surfactant preferably of polyethylene ether type of phenoxy polyethoxy type.

Among the preferred surfactants which are used in amounts of $\frac{1}{10}$ to 1% are aryl alkyl polyethylene ethers of nonionic characteristics such as:

Nonyl phenoxy polyethoxy ethanol,
Isooctyl phenoxy polyethoxy ethanol,
Pentyl phenoxy polyethoxy ethanol,
Phenoxy polyethoxy ethanol,
Tetradecyl phenoxy polyethoxy ethanol.

It is important that no sulfonated or sulfo groups be included in these compounds, and that, these compounds be mixed in a melted or liquid combination of hydrazine hydrobromide and 2 to 3% of water.

Less desirably, there may be included small amounts of cationic quaternary ammonium compounds such as, for example:

(dodecyl benzyl) diethyl (2-hydroxy) ammonium chloride,
(octyl phenyl) dimethyl ammonium bromide,
(butyl phenyl) dipropyl ammonium bromide, in the amount of 2 to 5%.

In making up the combination, the crystals or flakes of hydrazine hydrobromide, or less preferably the crystals or flakes of hydrazine hydrochloride, will melt with sufficient moisture being added so that the content will be about 2 to 10% water at a temperature of about 50° C.

Then $\frac{1}{10}$ to 1% of the above surfactants are added to the molten mixture with thorough stirring, and the mixture is allowed to crystallize. Then this crystalline mixture is melted at low temperature, and the melt forced into a large diameter tube composed of an alloy of tin and lead.

The preferred alloy is 60% of tin and 40% of lead for soldering electronics or 40% of tin and 60% of lead for general soldering.

The tubed alloy is thereupon allowed to cool off sufficiently to effect solidification of the liquid core whereupon it can be stretched and drawn to the desired gauge, for example, 16 gauge for commercial operations and 20 to 22 gauge for electronic core solder. By this operation, the final tubular structure will hold from ½ to 3% of hydrohalide salts.

After the salts have been inserted in the tube, the tube is then drawn down to 16 to 22 gauge so that the final tubular structure will have from ½ to 3% of hydrazine hydrohalide salts.

This composition when used will not sputter off, will give uniformity in the joint and will result in controlled and effective spreading.

The preferred surfactant is nonyl phenoxy polyethoxyethanol although other surfactants having similar chemical constituents may be employed.

There is attached hereto a single figure showing the final core solder in which the figure shows in perspective a section of the tube having an outer sheet A of a 60 tin-40 lead or 40 tin-60 lead or 63 tin-47 lead composition constituting 93 to 98% of the total weight.

The core B contains from 1½ to 3% of hydrazine hydrobromide composition containing 2 to 5% of water and $\frac{1}{10}$ to 1% of a nonionic surfactant such as an alkyl phenoxy polyethoxy alkanol.

In this compound, the alkyl group contains from 4 to 40 carbon atoms, and the alkanol group contains 2 to 4 carbon atoms.

We would mention here that it is essential that the hydrohalide core contains from 2 to 10% water.

As many changes could be made in the above core solder, and many widely different embodiments of this invention could be made without departing from the scope of the claims, it is intended that all matter contained in the above description shall be intepreted as illustrative and not in a limiting sense.

Having now particularly described and ascertained the nature of the invention, and in what manner the same is to be performed, what is claimed is:

1. A core solder having external tubular sheath of a lead-tin alloy containing one and one-half to 3% of central core consisting essentially of a hydrazine hydrohalide salt containing 2 to 10% of water and 1/10 to 1% of a surfactant and said hydrazine salt being selected from the group consisting of hydrazine hydrochloride and hydrazine hydrobromide and said surfactant being selected from the group consisting of an alkyl aryl polyethylene ether and a cationic quaternary ammonium surfactant.

2. A core solder containing a sheath of a lead-tin alloy and a central filling consisting of 90 to 98% hydrazine hydrobromide salt selected from the group consisting of hydrazine hydrochloride and hydrazine hydrobromide and containing a small amount of water in the amount of 2 to 10% and also containing 1/10 to 1% of an aryl alkyl polyethylene ether surfactant.

3. A core solder having an external tubular sheath of a tin-lead alloy containing 65 to 35% tin and a core consisting essentially of 90 to 98% of a salt selected from the group consisting of hydrazine hydrobromide and hydrazine hydrochloride and 1/10 to 1% of a surfactant, said surfactant being alkyl phenoxy polyethoxy alkanol and said core constituting 1/2 to 3% of the total sheath and core, said hydrazine salt containing 2 to 10% water, all percentages being by weight.

4. A core solder containing a sheath of a lead-tin alloy and a central filling consisting of 90 to 98% hydrazine hydrobromide salt selected from the group consisting of hydrazine hydrochloride and hydrazine hydrobromide and containing a small amount of water in the amount of 2 to 10% and also containing 1/10 to 1% of a surfactant, said surfactant being selected from the group consisting of an alkyl aryl polyethylene ether and a cationic quaternary ammonium surfactant.

References Cited in the file of this patent

UNITED STATES PATENTS

| | | |
|---|---|---|
| 3,030,241 | Brightly | Apr. 17, 1962 |

FOREIGN PATENTS

| | | |
|---|---|---|
| 599,805 | Great Britain | Mar. 22, 1948 |
| 605,110 | Great Britain | July 15, 1948 |
| 634,018 | Great Britain | Mar. 15, 1950 |

OTHER REFERENCES

Antara Chemicals Catalog, pages 11 and 12.